US006999075B2

(12) United States Patent
Kumagai

(10) Patent No.: US 6,999,075 B2
(45) Date of Patent: Feb. 14, 2006

(54) THREE-DIMENSIONAL INFORMATION DISPLAY APPARATUS

(75) Inventor: Shunichi Kumagai, Saitama (JP)

(73) Assignee: Pioneer Corporation, Tokyo (JP)

( * ) Notice: Subject to any disclaimer, the term of this patent is extended or adjusted under 35 U.S.C. 154(b) by 364 days.

(21) Appl. No.: 10/421,868

(22) Filed: Apr. 24, 2003

(65) Prior Publication Data

US 2003/0202018 A1 Oct. 30, 2003

(30) Foreign Application Priority Data

Apr. 26, 2002 (JP) .......................... P2002-127075

(51) Int. Cl.
*G06T 17/00* (2006.01)
*G06T 15/00* (2006.01)
*G08G 1/123* (2006.01)
*G01C 21/30* (2006.01)
*G01C 21/32* (2006.01)

(52) U.S. Cl. ..................... 345/420; 340/990; 340/995; 701/208; 701/211; 345/419

(58) Field of Classification Search ................ 345/420; 340/990, 995; 463/6; 701/208, 211
See application file for complete search history.

(56) References Cited

U.S. PATENT DOCUMENTS 4,937,570 A * 6/1990 Matsukawa et al. ........ 340/905
5,739,772 A * 4/1998 Nanba et al. ............... 340/990
5,913,918 A * 6/1999 Nakano et al. ............. 701/208
5,974,876 A * 11/1999 Hijikata et al. ........... 73/178 R
6,006,161 A * 12/1999 Katou ........................ 701/212
6,076,041 A * 6/2000 Watanabe ................... 701/211
6,111,539 A * 8/2000 Mannings et al. ..... 342/357.09
6,151,552 A * 11/2000 Koizumi et al. ............ 701/211
6,157,342 A * 12/2000 Okude et al. .......... 342/357.13
6,169,515 B1 * 1/2001 Mannings et al. ....... 342/357.1
6,169,516 B1 * 1/2001 Watanabe et al. ........... 342/335
6,175,802 B1 * 1/2001 Okude et al. ............... 701/208
6,272,431 B1 * 8/2001 Zamojdo et al. ............ 701/211
6,278,940 B1 * 8/2001 Endo .......................... 701/209
6,289,278 B1 * 9/2001 Endo et al. ................. 701/208
6,321,160 B1 * 11/2001 Takahashi ................... 701/209
6,324,469 B1 * 11/2001 Okude et al. ............... 701/208
6,341,254 B1 * 1/2002 Okude et al. ............... 701/208
6,360,168 B1 * 3/2002 Shimabara .................. 701/211
6,542,174 B2 * 4/2003 Senda et al. ................ 715/848

(Continued)

FOREIGN PATENT DOCUMENTS

EP 1 189 176 A2 3/2002

*Primary Examiner*—Ulka J. Chauhan
*Assistant Examiner*—Roberta Prendergast
(74) *Attorney, Agent, or Firm*—Sughrue Mion, PLLC

(57) ABSTRACT

A three-dimensional information display apparatus which has three-dimensional map information processing section adapted to process three-dimensional map information, three-dimensional route information processing section adapted to process three-dimensional route information, and three-dimensional information display section adapted to display the three-dimensional map information processed by the three-dimensional map information processing section and the three-dimensional route information processed by the three-dimensional route information processing section. If a road to the destination included in the three-dimensional map information contains a downward branch part, the three-dimensional route information processing section processes the three-dimensional route information so as to extend a part of a route to the road to be branched for display while maintaining the same height as the height on drawing of the route to the destination at the downward branch part.

7 Claims, 5 Drawing Sheets

U.S. PATENT DOCUMENTS 6,587,784 B1 * 7/2003 Okude et al. ............... 701/208
6,611,753 B1 * 8/2003 Millington .................. 701/209
6,710,774 B1 * 3/2004 Kawasaki et al. .......... 345/419
6,714,861 B2 * 3/2004 Okude et al. ............... 701/208
6,871,143 B2 * 3/2005 Fujiwara ..................... 701/211
2002/0038181 A1 3/2002 Okude et al.

* cited by examiner

THREE-DIMENSIONAL INFORMATION DISPLAY APPARATUS

The present disclosure relates to the subject matter contained in Japanese Patent Application No. 2002-127075 filed on Apr. 26, 2002, which is incorporated herein by reference in its entirety.

BACKGROUND OF THE INVENTION

1. Field of the Invention

The present invention relates to a three-dimensional information display apparatus suited for use with a system such as a car navigation system, for displaying three-dimensional map information including a road to a destination and three-dimensional route information indicating a route to the destination.

2. Description of the Related Art

Hitherto, a car navigation system for displaying map information and route information, thereby guiding a vehicle to a destination has been known. To display map information two-dimensionally in such a car navigation system, route information is displayed in a drawing-over (overwriting) manner because the concept of height does not exist. Alternatively, the concept of layers different in dimension as in cell animation is provided, whereby route information is displayed in a drawing-over (overwriting) manner. On the other hand, to display map information three-dimensionally, the concept of height exists and therefore route information is drawn in a three-dimensional coordinate system intact for display.

As making map representation more real in a car navigation system is advancing, to efficiently reproduce the scene as the driver sees, three-dimensional display is optimum; however, if map information and route information are displayed intact, the information and the route information may not necessarily become easy-to-see for the driver.

SUMMARY OF THE INVENTION

It is therefore an object of the invention to provide a three-dimensional information display apparatus for making it possible to enhance the recognition rate about map information and route information without impairing reality of map representation.

According to a first aspect of the invention, there is provided three-dimensional information display apparatus including: a three-dimensional map information processing section adapted to process three-dimensional map information including a information of a road to a destination; a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when the road to the destination included in the three-dimensional map information contains a downward branch part, the three-dimensional route information processing section processes the three-dimensional route information so as to display a part of the route extended to a road to be branched while maintaining the same height as the height on drawing of the route at the downward branch part.

According to a second aspect of the invention, there is provided a three-dimensional information display apparatus including: a three-dimensional map information processing section adapted to process three-dimensional map information including a information of a road to a destination; a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when a branching road branching from the road to the destination included in the three-dimensional map information contains an uphill road part, the three-dimensional map information processing section processes the three-dimensional map information so as to display a road portion higher than the viewpoint on drawing containing the uphill road part in a translucent manner.

According to a third aspect of the invention, there is provided a three-dimensional information display apparatus including: a three-dimensional map information processing section adapted to process three-dimensional map information including a information of a road to a destination; a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when the road to the destination included in the three-dimensional map information contains an uphill road part, the three-dimensional route information processing section processes the three-dimensional route information so as to display the route to the destination except the uphill road part below a road portion higher than the viewpoint on drawing.

According to a fourth aspect of the invention, there is provided a three-dimensional information display apparatus including: a three-dimensional map information processing section adapted to process three-dimensional map information including a information of a road to a destination; a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when the road to the destination included in the three-dimensional map information contains a merging part, the three-dimensional map information processing section processes the three-dimensional map information so as to display a merging road so that the height on drawing of the merging road matches the height on drawing of a road to be merged just before merging.

According to a fifth aspect of the invention, there is provided a three-dimensional information display apparatus including: a three-dimensional map information processing section adapted to process three-dimensional map information including a information of a road to a destination; a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when the road to the destination included in the three-dimensional map information contains a merging part, the three-dimensional map information processing section divides a three-dimensional polygon forming a merging road on the way and matches the height on drawing of the merging road with the height on drawing of a three-dimensional polygon forming a road to be merged, thereby processing the three-dimensional map information so as to display the merging road so that the height on drawing of the merging road matches the height on drawing of the road to be merged just before merging.

According to a sixth aspect of the invention, there is provided a three-dimensional information display apparatus including: a three-dimensional map information processing section adapted to process three-dimensional map information including a information of a road to a destination; a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when the road to the destination included in the three-dimensional map information contains a branch part, the three-dimensional map information processing section processes the three-dimensional map information so as to display a branching road so that the height on drawing of the branching road matches the height on drawing of a road to be branched just before branching.

According to a seventh aspect of the invention, there is provided a three-dimensional information display apparatus including: a three-dimensional map information processing section adapted to process three-dimensional map information including a information of a road to a destination; a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein the three-dimensional route information processing section processes the three-dimensional route information so as to display the route to the destination three-dimensionally.

According to an eighth aspect of the invention, there is provided a three-dimensional information display apparatus including: a three-dimensional map information processing section adapted to process three-dimensional map information including a information of a road to a destination; a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein the three-dimensional map information processing section processes the three-dimensional map information so as to display the road included in the three-dimensional map information with a transparency factor partially varied.

According to a ninth aspect of the invention, there is provided a three-dimensional information display apparatus including: a three-dimensional map information processing section adapted to process three-dimensional map information including a information of a road to a destination; a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein the three-dimensional map information processing section processes the three-dimensional map information so as to display the three-dimensional map information with the viewpoint on drawing temporarily varied, and wherein the three-dimensional route information processing section processes the three-dimensional route information so as to display the three-dimensional route information with the viewpoint on drawing temporarily varied in association with the display of the three-dimensional map information.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, An embodiment according to the invention will be described below.

Figure 1:
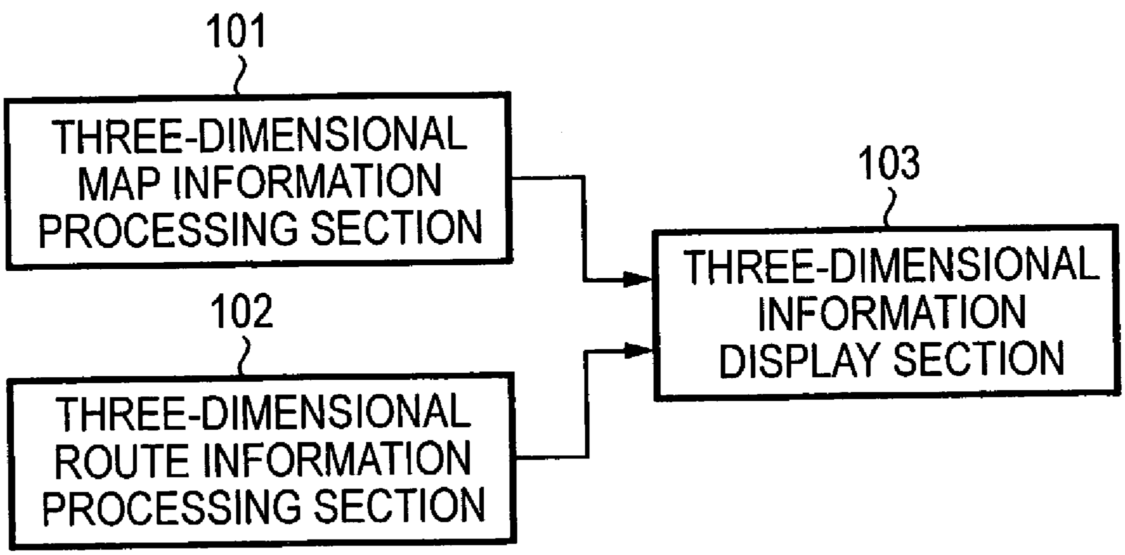
FIG. 1 is a block diagram showing the configuration of a three-dimensional information display apparatus to describe the concept of the invention.

To begin with, the concept of the invention will be discussed with reference to FIG. 1. In FIG. 1, a three-dimensional information display apparatus according to the invention includes three-dimensional map information processing section 101 adapted to process three-dimensional map information including a road to a destination, three-dimensional route information processing section 102 adapted to process three-dimensional route information indicating a route to the destination, and three-dimensional information display section 103 for displaying the three-dimensional map information processed by the three-dimensional map information processing section 101 and the three-dimensional route information processed by the three-dimensional route information processing section 102.

Figure 2:
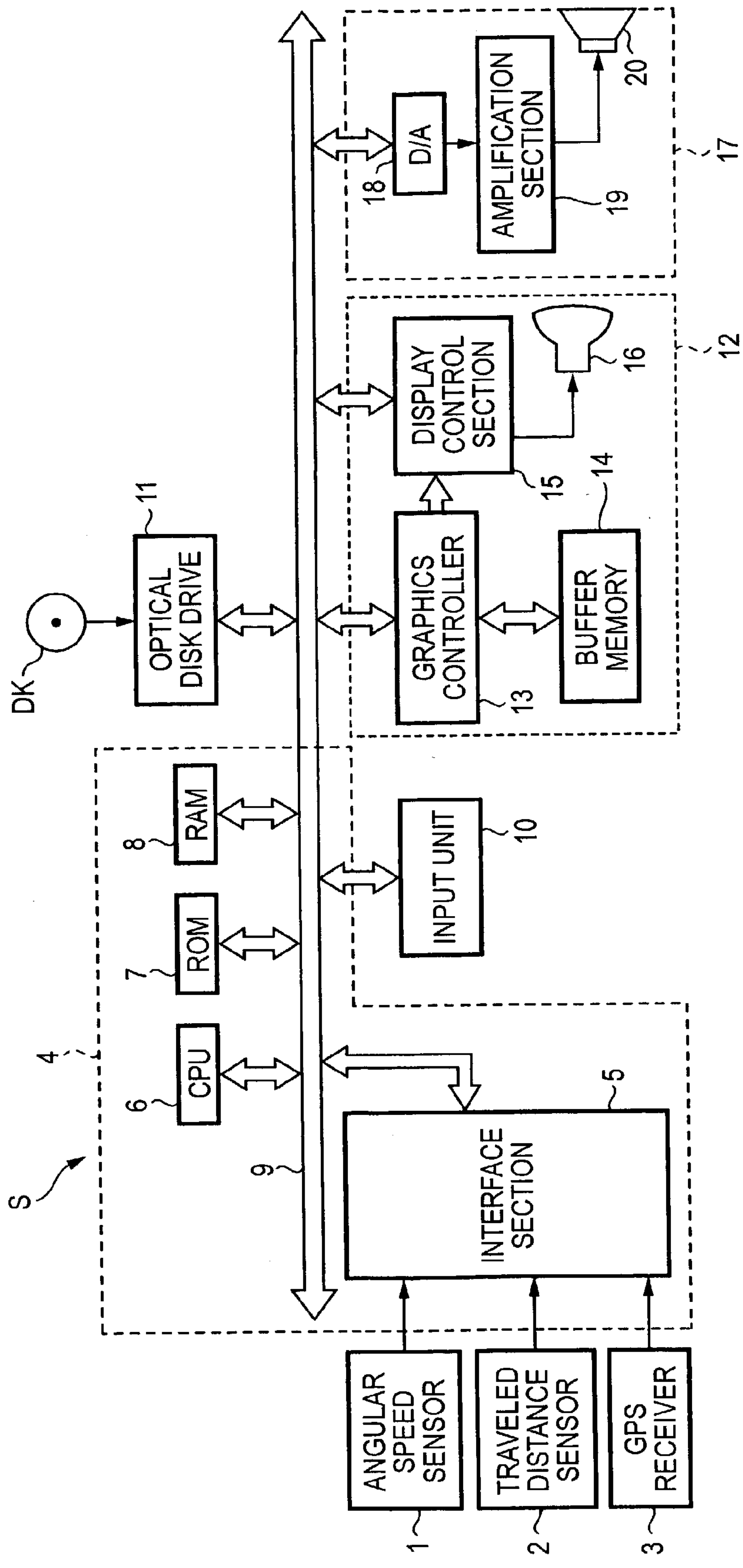
FIG. 2 is a block diagram showing the configuration of a car navigation system common to first to eighth embodiments incorporating the invention.
Figure 3:
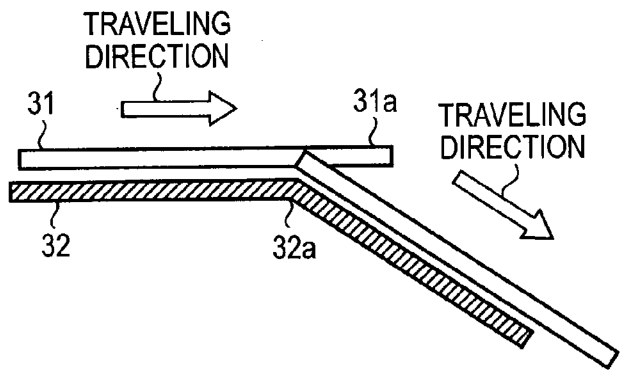
FIG. 3 is a drawing to describe processing in a first embodiment of the invention.

Referring now to the accompanying drawings (FIGS. 2 to 9), there are shown first to eighth embodiments of the invention. FIG. 2 is a block diagram showing a configuration of a car navigation system common to the first to eighth embodiments incorporating the invention. In FIG. 2, a car navigation system S comprises an angular velocity sensor 1 for detecting the angular velocity when the direction of the vehicle installing the car navigation system S is changed and outputting angular velocity data and relative bearing data, a mileage sensor 2 for counting the number of pulses in pulse signal in a predetermined period output with rotation of wheels, thereby calculating the number of pulses per revolution of wheel and outputting mileage data based on the number of pulses per revolution, a GPS receiver 3 for receiving radio waves from a GPS (Global Positioning System) satellite, outputting GPS positioning data, and also outputting absolute bearing data in the traveling direction of the vehicle, a system controller 4 for controlling the whole car navigation system based on the angular velocity data, the relative bearing data, the mileage data, the GPS positioning data, and the absolute bearing data, an input unit 10 such as a remote control for entering various pieces of data, an optical disk drive 11 for reading out various pieces of data such as map data containing road data indicating the number of lanes, the road widths, and the like, and data indicating the names of facilities or detailed information from an optical disk DK such as DVD (Digital Versatile Disk), under the control of the system controller 4, a display unit 12 for displaying various pieces of display data under the control of the system controller 4, and an audio playback unit 17 for playing back various pieces of audio data under the control of the system controller 4.

The system controller 4 includes an interface section 5 for performing interface operation with external sensors such as the GPS receiver 3, a CPU (Central Processing Unit) 6 for controlling the whole system controller 4, ROM (Read-Only Memory) 7 for storing a control program for controlling the system controller 4, and RAM (RandomAccess Memory) 8 having nonvolatile memory for storing various pieces of data such as route data preset by the user (for example, driver) through the input unit 10 in a readable manner. The system controller 4 is connected to the input unit 10, the optical disk drive 11, the display unit 12, and the audio playback unit 17 via a bus line 9. The CPU 6 is provided as the three-dimensional map information processing section 101 and the three-dimensional route information processing section 102.

The display unit 12 includes a graphics controller 13 for controlling the whole display unit 12 based on control data sent from the CPU 6 via the bus line 9, buffer memory 14 implemented as memory such as VRAM (Video RAM) for temporarily storing image data that can be displayed in an instant, and a display control section 15 for controlling a display 16 such as an LCD or a CRT display based on control data output from the graphics controller 13. The display 16 is provided as the three-dimensional information display section 103.

The audio playback unit 17 includes a D/A converter 18 for converting audio digital data sent from the optical disk drive 11 or the RAM 8 via the bus line 9 into an analog signal, an amplification section 19 for amplifying the audio analog signal output from the D/A converter 18, and a loudspeaker 20 for converting the amplified audio analog signal into audio and outputting the audio.

When the user (for example, driver) enters a destination through the input unit 10 in the described car navigation system S, data such as the map data recorded on the optical disk DK is read out by the optical disk drive 11 based on the input information and is stored in the RAM 8. Next, the CPU 6 generates three-dimensional map information including a road to the destination and three-dimensional route information indicating a route to the destination, and again stores the information in the RAM 8. Then, the CPU 6 performs appropriate processing as described later for the three-dimensional map information and the three-dimensional route information stored in the RAM 8, and displays the processed three-dimensional map information and the processed three-dimensional route information on the display 16.

[First Embodiment]

Figure 4:
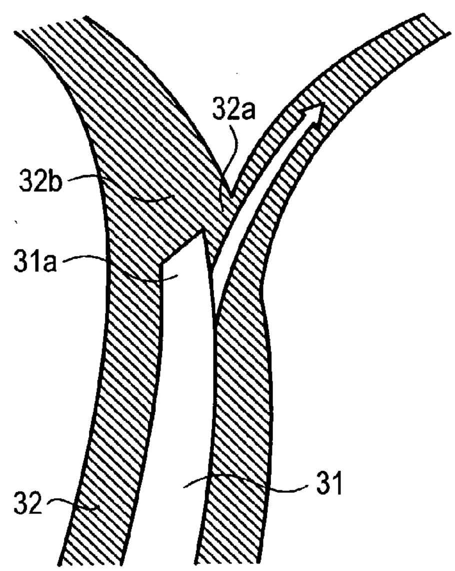
FIG. 4 is a drawing to describe processing in the first embodiment of the invention.

A first embodiment of the invention is intended for improving display when the road to the destination included in three-dimensional map information contains a downward branch part (for example, a downward part of a road of a three-dimensional intersection). In the first embodiment, a CPU 6 as three-dimensional route information processing section processes three-dimensional route information so as to display a part 31*a* of a route 31 extended to a road to be branched 32*b* adequately while maintaining the same height as the height on drawing of the route 31 at a downward branch part 32*a* existing in a road 32 to the destination. The road 32 and the route 31 are shown in the state viewed from the side for easy understanding in FIG. 3; in fact, however, they are displayed three-dimensionally as shown in FIG. 4. According to the first embodiment, the part 31*a* of the route 31 to the destination is extended adequately to the road to be branched 32*b*, so that the visibility of the downward branch part 32*a* can be enhanced.

[Second Embodiment]

Figure 5:
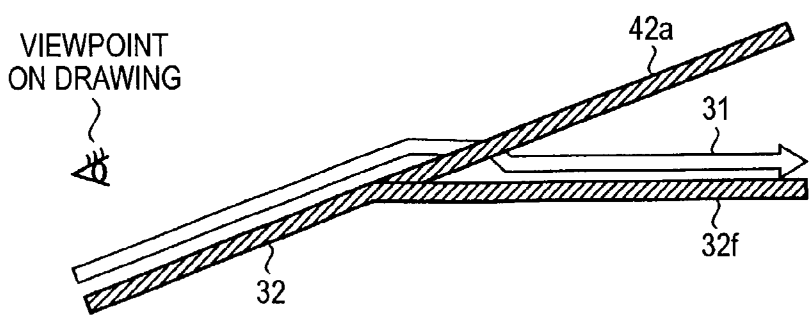
FIG. 5 is a drawing to describe processing in a second embodiment of the invention.

A second embodiment of the invention is intended for improving display when a branching road branching from the road to the destination included in three-dimensional map information contains an uphill road part. In the second embodiment, a CPU 6 as three-dimensional map information processing section processes three-dimensional map information so as to display the road portion higher than the viewpoint on drawing (the viewpoint on displaying three-dimensional map information) containing an uphill road part 42*a* branching from a road 32 (shown with a route 31) to the destination in a translucent manner, as shown in FIG. 5. The road portion higher than the viewpoint on drawing containing the uphill road part 42*a*, the road 32, and the route 31 are shown in the state viewed from the side for easy understanding in FIG. 5; in fact, however, they are displayed three-dimensionally. According to the second embodiment, the road portion higher than the viewpoint on drawing containing the uphill road part 42*a* is displayed in a translucent manner, so that a part 32*f* of the road 32 to the destination existing ahead of the uphill road part 42*a* is seen through the uphill road part 42*a* and therefore the visibility of the road can be enhanced.

[Third Embodiment]

Figure 6:
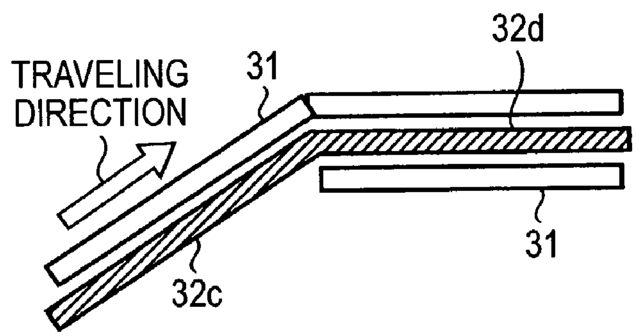
FIG. 6 is a drawing to describe processing in a third embodiment of the invention.
Figure 7:
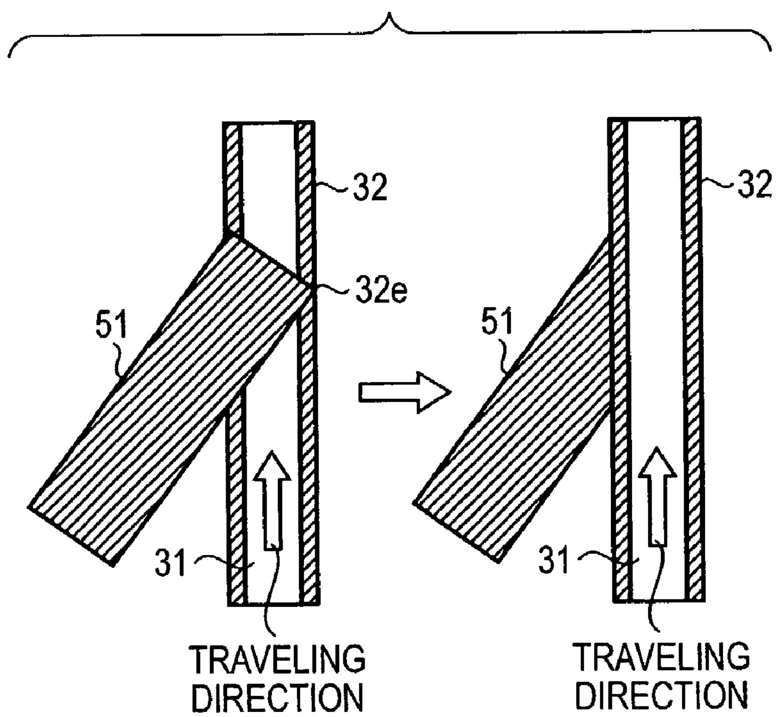
FIG. 7 is a drawing to describe processing in a fourth embodiment of the invention.

A third embodiment of the invention is intended for improving display when the road to the destination included in three-dimensional map information contains an uphill road part. In the third embodiment, a CPU 6 as three-dimensional route information processing section processes three-dimensional route information so as to display a route 31 to the destination below a road portion 32*d* higher than the viewpoint on drawing (the viewpoint on displaying three-dimensional map information) except an uphill road part 32*c*, as shown in FIG. 6. The road portion 32*d* higher than the viewpoint on drawing except the uphill road part 32*c* and the route 31 are shown in the state viewed from the side for easy understanding in FIG. 6; in fact, however, they are displayed three-dimensionally. According to the third embodiment, the route 31 to the destination is displayed below the road portion 32*d* higher than the viewpoint on drawing except the uphill road part 32*c*, so that the visibility of the route 31 when viewed from below can be enhanced.

[Fourth Embodiment]

A fourth embodiment of the invention is intended for improving display when the road to the destination included in three-dimensional map information contains a merging part. In the fourth embodiment, a CPU 6 as three-dimensional map information processing section processes three-dimensional map information so as to display a merging road 51 so that the height on drawing of the merging road 51 matches the height on drawing of a road to be merged 32 just before merging. Specifically, the CPU 6 as the three-dimensional map information processing section divides the three-dimensional polygon forming the merging road 51 on the way and matches the height on drawing of the merging road 51 with the height on drawing of the three-dimensional polygon forming the road to be merged 32, thereby processing the three-dimensional map information. In association with this, the CPU 6 as three-dimensional route information processing section processes three-dimensional route information so as to display the route 31 completely just before merging. The merging road 51, the road to be merged 32, and the route 31 are shown in the state viewed from the top for easy understanding in FIG. 7; in fact, however, they are displayed three-dimensionally. According to the fourth embodiment, the merging road 51 is displayed so that the height on drawing of the merging road 51 matches the height on drawing of the road to be merged 32 just before merging, and therefore the recognition rate of a merging part 32*e* can be enhanced.

[Fifth Embodiment]

A fifth embodiment of the invention is intended for improving display when the road to the destination included in three-dimensional map information contains a branch part. In the fifth embodiment, although not shown by reference to the drawings, as in the same manner of the fourth embodiment, a CPU 6 as three-dimensional map information processing section processes three-dimensional map information so as to display a branch road so that the height on drawing of the branch road matches the height on drawing of a road to be branched just before branching. According to the fifth embodiment, the branch road is displayed so that the height on drawing of the branch road matches the height on drawing of the road to e branched just before branching, and therefore the visibility of the branch part can be enhanced.

[Sixth Embodiment]

Figure 8:
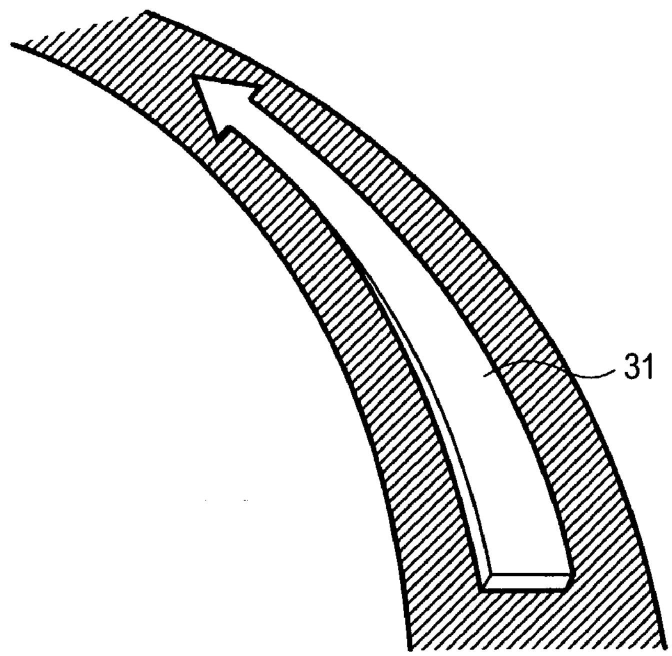
FIG. 8 is a drawing to describe processing in a sixth embodiment of the invention.

A sixth embodiment of the invention is intended for improving display of a route to the destination. In this case, a CPU 6 as three-dimensional route information processing section processes three-dimensional route information so as to display a route 31 to the destination three-dimensionally, as shown in FIG. 8. According to the sixth embodiment, the route 31 to the destination is displayed three-dimensionally, so that the visibility of the route 31 when viewed from the side can be enhanced.

[Seventh Embodiment]

A seventh embodiment of the invention is intended for improving display of a road. In this case, although not shown by reference to the drawings, a CPU 6 as three-dimensional map information processing section processes three-dimensional map information so as to display the road included in the three-dimensional map information with the transparency factor partially varied (for example, with the transparency factor varied from one place to another of a three-dimensional intersection). According to the seventh embodiment, the road included in the three-dimensional map information is displayed with the transparency factor partially varied, so that the visibility of the route to the destination can be enhanced.

[Eighth Embodiment]

Figure 9:
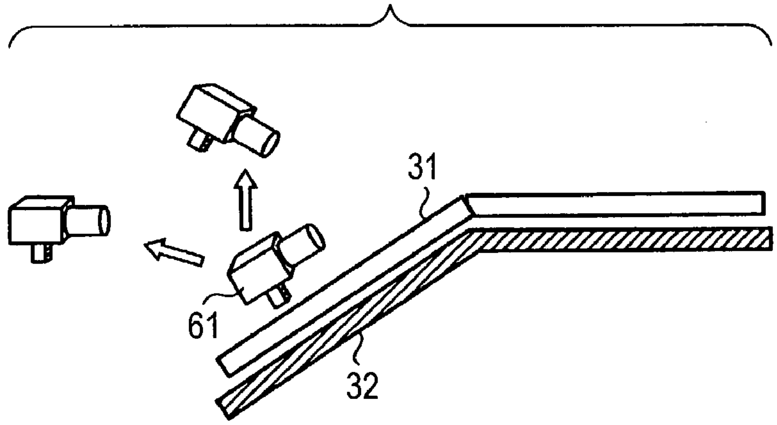
FIG. 9 is a drawing to describe processing in an eighth embodiment of the invention.

An eighth embodiment of the invention is intended for improving display of three-dimensional map information and three-dimensional route information. In the eighth embodiment, a CPU 6 as three-dimensional map information processing section processes three-dimensional map information so as to display the three-dimensional map information with the viewpoint on drawing (the viewpoint on displaying the three-dimensional map information) temporarily varied, and the CPU 6 as three-dimensional route information processing section processes three-dimensional route information so as to display the three-dimensional route information temporarily with the viewpoint on drawing temporarily varied in association with the display of the three-dimensional map information. For example, as shown in FIG. 9, a road 32 to the destination included in the three-dimensional map information is displayed with the viewpoint on drawing changed to a high position (displayed as if position of a camera 61 were changed to a high position) and a route 31 to the destination included in the three-dimensional route information is displayed with the viewpoint on drawing changed to a high position in association with the display of the road 32, the visibility of the whole route can be enhanced. Thus, according to the eighth embodiment, the three-dimensional map information is displayed with the viewpoint on drawing temporarily varied, and the three-dimensional route information is displayed with the viewpoint on drawing temporarily varied in association with the display of the three-dimensional map information, so that the visibility of the route 31 can be enhanced.

As seen from the description above, the three-dimensional information display apparatus according to the invention performs appropriate processing (so-called deforming) for the three-dimensional map information and the three-dimensional route information for display, and can enhance the visibility about the map information and the route information without impairing reality of map representation.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A three-dimensional information display apparatus comprising:

a three-dimensional map information processing section adapted to process three-dimensional map information including a information of a road to a destination;

a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when the road to the destination included in the three-dimensional map information contains a downward branch part, the three-dimensional route information processing section processes the three-dimensional route information so as to display a part of the route extended to a road to be branched while maintaining the same height as the height on drawing of the route at the downward branch part.

2. A three-dimensional information display apparatus comprising:

a three-dimensional map information processing section adapted to process three-dimensional map information including a information of a road to a destination;

a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when a branching road branching from the road to the destination included in the three-dimensional map information contains an uphill road part, the three-dimensional map information processing section processes the three-dimensional map information so as to display a road portion higher than the viewpoint on drawing containing the uphill road part in a translucent manner.

3. A three-dimensional information display apparatus comprising:

a three-dimensional map information processing section adapted to process three-dimensional map information including a information of a road to a destination;

a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when the road to the destination included in the three-dimensional map information contains an uphill road part, the three-dimensional route information processing section processes the three-dimensional route information so as to display the route to the destination except the uphill road part below a road portion higher than the viewpoint on drawing.

4. A three-dimensional information display apparatus comprising:

a three-dimensional map information processing section adapted to process three-dimensional map information including a information of a road to a destination;

a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when the road to the destination included in the three-dimensional map information contains a merging part, the three-dimensional map information processing section processes the three-dimensional map information so as to display a merging road so that the height on drawing of the merging road matches the height on drawing of a road to be merged just before merging.

5. A three-dimensional information display apparatus comprising:

a three-dimensional map information processing section adapted to process three-dimensional map information including a information of a road to a destination;

a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when the road to the destination included in the three-dimensional map information contains a merging part, the three-dimensional map information processing section divides a three-dimensional polygon forming a merging road on the way and matches the height on drawing of the merging road with the height on drawing of a three-dimensional polygon forming a road to be merged, thereby processing the three-dimensional map information so as to display the merging road so that the height on drawing of the merging road matches the height on drawing of the road to be merged just before merging.

6. A three-dimensional information display apparatus comprising:

a three-dimensional map information processing section adapted to process three-dimensional map information including a information of a road to a destination;

a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein when the road to the destination included in the three-dimensional map information contains a branch part, the three-dimensional map information processing section processes the three-dimensional map information so as to display a branching road so that the height on drawing of the branching road matches the height on drawing of a road to be branched just before branching.

7. A three-dimensional information display apparatus comprising:

a three-dimensional map information processing section adapted to process three-dimensional map information including a information of a road to a destination;

a three-dimensional route information processing section adapted to process three-dimensional route information indicating a route to the destination; and a three-dimensional information display section adapted to display the three-dimensional map information processed by the three-dimensional map information processing section and the three-dimensional route information processed by the three-dimensional route information processing section, wherein the three-dimensional map information processing section processes the three-dimensional map information so as to display the road included in the three-dimensional map information with a transparency factor partially varied.

* * * * *